US009253084B2

(12) United States Patent
Esale

(10) Patent No.: US 9,253,084 B2
(45) Date of Patent: Feb. 2, 2016

(54) NEIGHBOR-LABEL DISTRIBUTION WITH LABEL DISTRIBUTION PROTOCOL

(71) Applicant: Juniper Networks, Inc., Sunnyvale, CA (US)

(72) Inventor: Santosh Esale, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 75 days.

(21) Appl. No.: 14/188,148

(22) Filed: Feb. 24, 2014

(65) Prior Publication Data

US 2015/0244615 A1    Aug. 27, 2015

(51) Int. Cl.
*H04L 12/723* (2013.01)
*H04L 12/705* (2013.01)
*H04L 12/707* (2013.01)

(52) U.S. Cl.
CPC .............. *H04L 45/507* (2013.01); *H04L 45/18* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 8,861,340 B1 * | 10/2014 | Atlas .............................. | 370/225 |
| 2007/0253416 A1 * | 11/2007 | Raj ............................... | 370/390 |
| 2009/0144443 A1 * | 6/2009 | Vasseur et al. ................. | 709/238 |
| 2009/0182894 A1 * | 7/2009 | Vasseur et al. ................. | 709/239 |
| 2012/0069745 A1 * | 3/2012 | Kini et al. ...................... | 370/252 |
| 2013/0336103 A1 * | 12/2013 | Vasseur et al. ................. | 370/216 |

FOREIGN PATENT DOCUMENTS

EP    2663040 A1    11/2013

OTHER PUBLICATIONS

Bryant et al., "IP Fast Reroute using tunnels draft-bryant-ipfrr-tunnels-03," IETF Trust, Nov. 16, 2007, 30 pp.
Gredler, "Advertising MPLS labels in IGPs draft-gredler-rtgwg-igp-label-advertisement-02," IETF Trust, Inc., Feb. 20, 2013, 10 pp.
Bryant et al., "Remote LFA FRR draft-ietf-rigwg-remote-lfa-01," IETF Trust, Dec. 19, 2012, 14 pp.
Rosen et al., "Multiprotocol Label Switching Architecture," The Internet Society, Jan. 2001, 62 pp.
Anderson et al., "LDP Specification," IETF Trust, Oct. 2007, 136 pp.
Atlas et al., "Basic Specification for IP Fast Reroute: Loo-Free Alternates," IETF Trust, Sep. 2008, 32 pp.

(Continued)

*Primary Examiner* — Brian Roberts
(74) *Attorney, Agent, or Firm* — Shumaker & Sieffert, P.A.

(57) ABSTRACT

Label Distribution Protocol (LDP) extensions are described that enable distribution of neighbor-label mappings for directly connected neighbor routers. A router capable of supporting the LDP extensions distributes neighbor-labels to be used by the router to label switch traffic destined for the directly connected neighbor router irrespective of a hop-by-hop Interior Gateway Protocol (IGP) path determined based on link metrics. In some examples, the neighbor-labels may increase backup coverage, e.g., link protection and/or node protection, in a network that, due to link metrics, does not have a viable loop-free alternate (LFA) path between an ingress router and an egress router of a label switched path (LSP). In other examples, the neighbor-labels may improve load balancing by enabling an ingress router in a first autonomous system (AS) to select a particular remote link on which to send traffic destined for remote routers in a second AS.

41 Claims, 8 Drawing Sheets

(56) References Cited

OTHER PUBLICATIONS

Aggarwal et al., "MPLS Upsteam Label Assignment and Context-Specific Label Space," IETF Trust, Aug. 2008, 14 pp.
Thomas et al., "LDP Capabilities," IETF Trust, Jul. 2009, 13 pp.
Asati et al., "Label Distribution Protocal (LDP) 'Typed Wildcard' Forward Equivalence Class (FEC)," IETF Trust, Aug. 2010, 11 pp.
Bryant et al, "Remote LFA FRR" Networking Working Group Internet Draft, draft-ietf-rtgwg-remote-lfa-04, Nov. 22, 2013, 24 pp.
Extended Search Report from counterpart European Application No. 15156309.5, dated Feb. 7, 2015, 5 pp.

* cited by examiner

NEIGHBOR-LABEL DISTRIBUTION WITH LABEL DISTRIBUTION PROTOCOL

TECHNICAL FIELD

The disclosure relates to computer networks and, more particularly, to forwarding traffic within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as link-state routing protocols of Interior Gateway Protocol (IGP). In link-state routing, the routers typically exchange information related to available interfaces, metrics and other variables associated with links between the routers. This allows each of the routers to construct its own topology or map of the network. Some examples of link-state routing protocols include the Open Shortest Path First (OSPF) protocol and the Intermediate-System to Intermediate System (IS-IS) protocol.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution Protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from a source device, commonly known as an ingress router, to a destination device, commonly known as an egress router, of the LSP. Ingress and egress routers are referred to generally as label edge routers (LERs), and intermediate routers along the LSP that support MPLS are referred to generally as label switching routers (LSRs). A short label associated with a particular LSP is affixed to packets that travel through the network via the LSP. LSRs along the path cooperatively perform MPLS operations to forward the MPLS packets along the established path.

A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the egress LER of the LSP. In general, each router along the LSP maintains a context that associates a FEC with an incoming label and an outgoing label. The ingress LER uses routing information, propagated from the egress LER, to determine the LSP, assign labels for the LSP, and affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table, and forwards the packet to the appropriate downstream LSR or LER. The egress LER removes the label from the packet and forwards the packet to its destination in accordance with non-label based packet forwarding techniques.

SUMMARY

In general, this disclosure describes extensions to Label Distribution Protocol (LDP) to enable distribution of neighbor-label mappings for directly connected neighbor routers. The neighbor-labels enable traffic to be switched to the directly connected neighbor router irrespective of a hop-by-hop Interior Gateway Protocol (IGP) path determined based on link metrics. In some examples, the neighbor-labels may increase backup coverage, e.g., link protection and/or node protection, in a network that, due to link metrics, does not have a viable loop-free alternate (LFA) path between an ingress router and an egress router of a label switched path (LSP). In other examples, the neighbor-labels may improve load balancing by enabling an ingress router in a first autonomous system (AS) to select a particular remote link on which to send traffic destined for remote routers in a second AS.

According to the techniques of this disclosure, a router capable of supporting the LDP extensions allocates neighbor-labels for directly connected neighbor routers, and installs neighbor-label forwarding state in its forwarding information. The router distributes LDP neighbor-label mapping messages indicating the neighbor-label mappings to LDP peer routers that are also capable of supporting the LDP extensions. Each of the peer routers has either a direct LDP session or a targeted LDP session with the router distributing the neighbor-label mapping messages. Upon receipt of the messages, each of the receiving peer routers stores the indicated neighbor-label mappings and drops the messages without forwarding the messages. In order to send traffic to a specific neighbor router of a downstream peer router, an upstream peer router sends traffic including a label for a forwarding equivalence class (FEC) destined for the downstream peer router and the neighbor-label advertised by the downstream peer router. The downstream peer router then forwards the traffic to the neighbor router according to the neighbor-label forwarding state installed in forwarding information of the downstream peer router.

In one example, the disclosure is directed to a method comprising allocating, with a router, neighbor-labels to be used by the router to label switch traffic destined for respective ones of a plurality of neighbor routers directly connected to the router, distributing, with the router to one or more LDP peer routers of the router, LDP neighbor-label mapping messages indicating mappings between the allocated neighbor-labels and the neighbor routers, wherein each of the LDP peer routers has one of a direct LDP session with the router or a targeted LDP session with the router, receiving, with the router from one of the LDP peer routers, traffic encapsulated with one of the neighbor-labels, and forwarding the traffic to one of the neighbor routers based on the one of the neighbor-labels.

In another example, the disclosure is directed to a router comprising a routing engine configured to allocate neighbor-labels to be used by the router to label switch traffic destined for respective ones of a plurality of neighbor routers directly connected to the router, and distribute, to one or more LDP peer routers of the router, LDP neighbor-label mapping messages indicating mappings between the allocated neighbor-labels and the neighbor routers, wherein each of the LDP peer routers has one of a direct LDP session or a targeted LDP session with the router. The router further comprises a forwarding engine configured to receive traffic encapsulated with one of the neighbor-labels from one of the LDP peer routers, and forward the traffic to one of the neighbor routers based on the one of the neighbor-labels.

In a further example, the disclosure is directed to a method comprising receiving, with a router from one or more LDP peer routers of the router, LDP neighbor-label mapping messages indicating mappings between neighbor-labels and neighbor routers directly connected to the LDP peer routers, wherein the neighbor-labels are used by the LDP peer routers to label switch traffic destined for respective ones of the directly connected neighbor routers, and wherein each of the LDP peer routers has one of a direct LDP session or a targeted LDP session with the router, storing, with the router, the neighbor-label mappings from each of the LDP peer routers, and sending, with the router, traffic encapsulated with one of the neighbor-labels toward one of the LDP peer routers for forwarding to one of the neighbor routers based on the one of the neighbor-labels.

In another example, the disclosure is directed to a router comprising a routing engine configured to receive, from one or more LDP peer routers of the router, LDP neighbor-label mapping messages indicating mappings between neighbor-labels and neighbor routers directly connected to the LDP peer routers, and store the neighbor-label mappings from each of the LDP peer routers, wherein the neighbor-labels are used by the LDP peer routers to label switch traffic destined for respective ones of the directly connected neighbor routers, and wherein each of the LDP peer routers has one of a direct LDP session or a targeted LDP session with the router. The router further comprise a forwarding engine configured to send traffic encapsulated with one of the neighbor-labels from the router toward one of the LDP peer routers for forwarding to one of the neighbor routers of the one of the LDP peer routers based on the one of the neighbor-labels.

In an additional example, the disclosure is directed to a computer-readable storage medium comprising instructions that cause a programmable processor to allocate, with a router, neighbor-labels to be used by the router to label switch traffic destined for respective ones of a plurality of neighbor routers directly connected to the router, distribute, with the router to one or more LDP peer routers of the router, LDP neighbor-label mapping messages indicating mappings between the allocated neighbor-labels and the neighbor routers, wherein each of the LDP peer routers has one of a direct LDP session with the router or a targeted LDP session with the router, receive, with the router from one of the LDP peer routers, traffic encapsulated with one of the neighbor-labels, and forward the traffic to one of the neighbor routers based on the one of the neighbor-labels.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
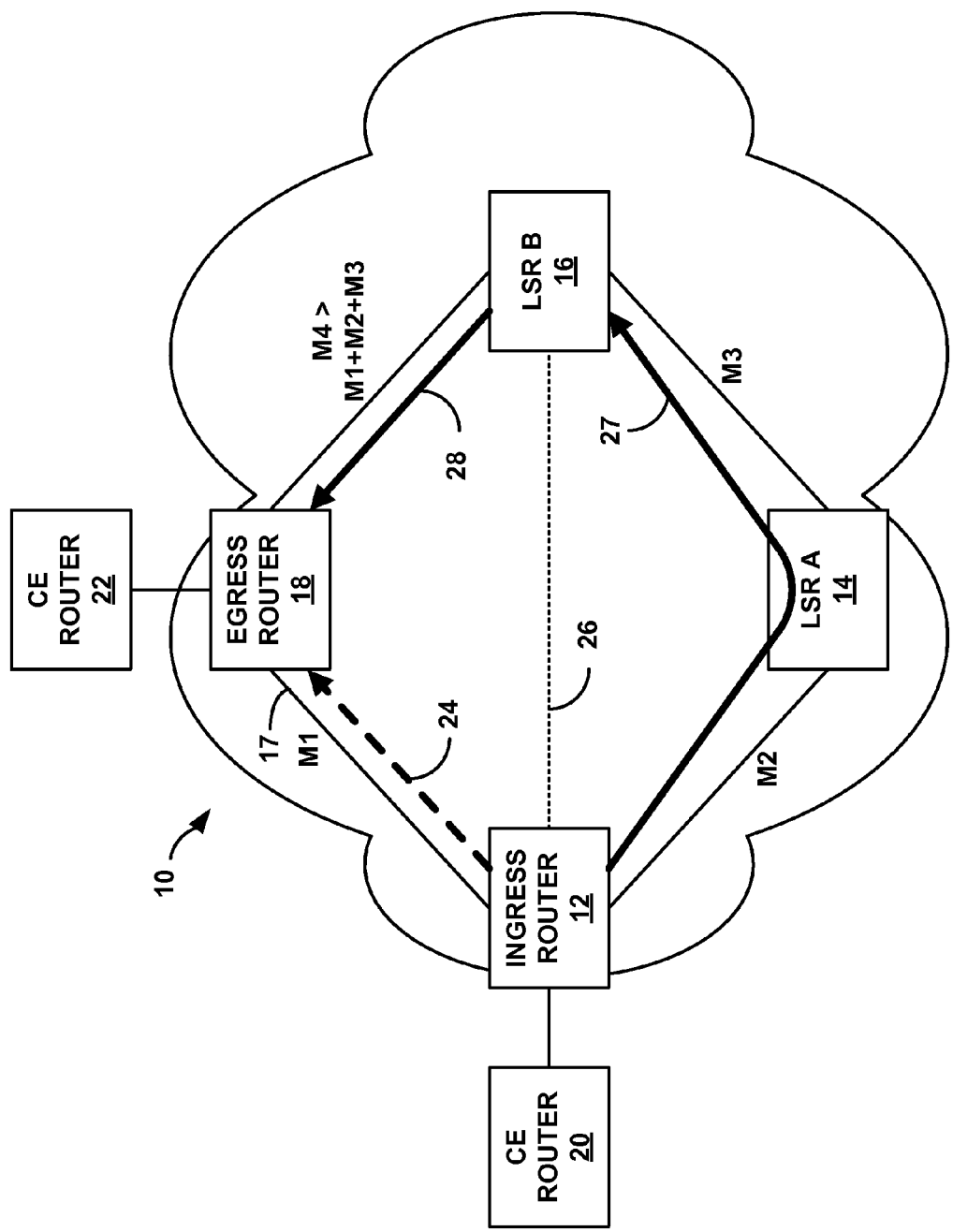
FIG. 1 is a block diagram illustrating an example network including routers configured to provide link protection using neighbor-labels distributed with LDP.

FIG. 1 is a block diagram illustrating an example network 10 including routers configured to provide link protection using neighbor-labels distributed with Label Distribution Protocol (LDP). As illustrated in FIG. 1, network 10 includes an ingress router 12, a label switching router (LSR) A 14, a LSR B 16, and an egress router 18. Ingress router 12 is connected to customer edge (CE) router 20, and egress router 18 is connected CE router 22. Each of CE routers 20 and 22 may be connected to one or more customer devices (not shown) to provide access to network 10. The customer devices may include personal computers, laptops, workstations, personal digital assistants (PDAs), wireless devices, network-ready appliances, file servers, print servers or other devices that access network 10. In some examples, the customer devices may be included in remote subscriber networks that include local area networks (LANs) or wide area networks (WANs).

The routers in network 10 each maintain routing information that describes available routes through network 10. In order to maintain an accurate representation of network 10, the routers exchange routing information in accordance with a defined routing protocol, such as a link-state routing protocol of Interior Gateway Protocol (IGP). For example, each of the routers may use a link-state routing protocol, such as the Open Shortest Path First (OSPF) protocol or the Intermediate-System to Intermediate System (IS-IS) protocol, to exchange link-state routing information to learn the topology of network 10. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

The routers in network 10 each process the routing information to calculate next hops to reach other routers in network 10, and install the next hops in forwarding information for forwarding network traffic destined for the other routers. These next hops may be referred to as "primary next hops." The primary next hops are used for forwarding network traffic in the absence of any detected network failures. In this way, each of the routers in network 10 determines a primary next hop along a hop-by-hop IGP primary path to each destination router. The determination of the primary next hops typically takes into account IGP primary paths calculated using a common shortest path algorithm that identifies the path having the lowest total cost associated with all of the links traversed. For example, ingress router 12 determines a primary next hop to egress router 18 along link 17 having link metric M1.

In some examples, each of the routers in network 10 may also be configured to calculate and install alternate next hops to each destination router, for use in forwarding network traffic if a failure is detected on a link or node associated with the respective primary next hop. When a failure occurs, the router uses the alternate next hop for forwarding network traffic until the shortest path algorithm has re-computed the next hops for the updated network topology and installed the re-computed next hops in the packet forwarding component.

In some cases, the routers in network 10 may calculate the alternate next hops using a loop-free alternate (LFA) calculation. For LFAs, an alternate next hop will be loop-free, meaning that the next hop will not send the traffic to the destination router on a path that goes back through the protected link or node. An LFA may be selected as any neighbor router having a primary path toward the destination router that satisfies the loop-free criterion. In some cases, a remote LFA may be calculated, in which tunnels are used to provide additional logical links to remote nodes that can then be used as LFAs where none exist in the original topology. The remote LFA may be selected as any remote router having a primary path toward the destination router that satisfies the loop-free criterion. Fast Reroute (FRR) using LFA is described in more detail in Atlas, A., "Basic Specification for IP Fast Reroute: Loop-Free Alternates," RFC 5286, September, 2008, the entire contents of which are incorporated by reference herein. FRR using remote LFA is described in more detail in Bryant, S., "Remote LFA FRR," draft-ietf-rtgwg-remote-lfa-01, Dec. 19, 2012, the entire contents of which are incorporated by reference herein.

In both the traditional LFA and the remote LFA case, the selection of the LFA next hop or remote LFA next hop takes into account primary paths calculated using the common shortest path algorithm. For some topologies, notably ring-based topologies in which the only alternate path is a longest path to the destination router that traverses all the way around the ring to avoid the protected link or node, no suitable LFA next hops may exist. This is the case in the ring-based topology of network 10 illustrated in FIG. 1. As described above, in network 10 ingress router 12 determines a primary next hop to egress router 18 along direct link 17. Ingress router 12, however, cannot determine a LFA next hop to reach egress router 18 in the event of a failure of direct link 17.

In the illustrated example of FIG. 1, link 17 between ingress router 12 and egress router 18 has a link metric M1, the link between ingress router 12 and LSR A 14 has a link metric M2, the link between LSR A 14 and LSR B 16 has a link metric M3, and the link between LSR B 16 and egress router 18 has a link metric M4. In this example, link metric M4 has a value greater than the sum of link metrics M1, M2 and M3. In the ring-based topology of network 10, IGP alternate paths from LSR A 14 and LSR B 16 toward egress router 18 would both loop back along protected link 17 in order to reach egress router 18 without using the longest path to egress router 18 along the link with metric M4. Although LSR B 16 has a direct link to egress router 18, LSR B 16 cannot act as a LFA next-hop toward egress router 18. Therefore, ingress router 12 does not have backup coverage to reach egress router 18 in the event of a failure of link 17.

Network 10 may comprise an Internet Protocol (IP) network that uses Multi-Protocol Label Switching (MPLS) mechanisms to encapsulate packets of various network protocols for transport across network 10. MPLS protocols, such as the Label Distribution Protocol (LDP) or the Resource Reservation Protocol with Traffic Engineering extensions (RSVP-TE), enable routers to establish specific paths through network 10, i.e., Label Switched Paths (LSPs). A set of packets to be forwarded in a same manner along a same LSP is referred to as a forwarding equivalence class (FEC). Typically, a FEC definition includes the IP address of the egress router of the LSP. Using MPLS mechanisms, data packets are assigned labels to identify the FEC to which the packets belong, and forwarding decisions are made for the data packets based on the labels. The labels are included in MPLS headers used to encapsulate the packets for transport along the LSP. In some examples, the labels are "stacked" to establish segmented LSP tunnels in which multiple LSPs are nested together in order to reach an egress router of the last LSP on the label stack. Label assignment in the MPLS architecture is described in more detail in Aggarwal, R., "MPLS Upstream Label Assignment and Context-Specific Label Space," RFC 5331, August 2008, the entire contents of which are incorporated by reference herein.

In MPLS network 10, the routers use LDP to distribute labels to other routers along the hop-by-hop IGP paths to establish LSPs. More specifically, the routers distribute LDP label mapping messages (LMMs) indicating assigned labels and associated FECs for the LSPs. In the example of FIG. 1, egress router 18 distributes a LDP LMM to ingress router 12 along the IGP primary path to establish primary LSP 24 between ingress router 12 and egress router 18. In addition, LSR B 16 may distribute a LDP LMM to LSR A 14, which in turn distributes a LDP LMM to ingress router 12 to establish LSP 27 between ingress router 12 and LSR B 16.

Two routers that use LDP to exchange label mapping information are referred to as LDP peer routers. Directly connected neighbor routers may be LDP peer routers with a direct LDP session. For example, ingress router 12 and egress router 18 are LDP peer routers with a direct LDP session. In the case where non-neighbor routers want to be LDP peer routers, the non-neighbor routers may establish a targeted LDP session between them. For example, ingress router 12 and LSR B 16 may be LDP peer routers with a targeted LDP session 26. More information on LDP is described in Anderson, L., "LDP Specification," RFC 5036, October 2007, the entire contents of which are incorporated by reference herein. More information on MPLS is described in Rosen, E., "Multiprotocol Label Switching Architecture," RFC 3031, January 2001, the entire contents of which are incorporated by reference herein.

This disclosure describes extensions to LDP to enable distribution of neighbor-label mappings for directly connected neighbor routers. The neighbor-labels enable traffic to be switched to the directly connected neighbor router irrespective of hop-by-hop IGP paths determined for the network topology. The techniques of this disclosure include nesting multiple LDP LSPs to establish a segmented LSP tunnel to reach a destination router using the neighbor-label to improve fast re-route coverage and load balancing in MPLS networks.

In the example of FIG. 1, the techniques of this disclosure provide ingress router 12 with backup coverage for forwarding network traffic to egress router 18 in the event of a failure of link 17. According to the techniques, LSR B 16 may distribute a neighbor-label mapping for directly connected neighbor egress router 18 to LDP peer routers, including ingress router 12 over targeted LDP session 26. The neighbor-label mapping enables ingress router 12 to send traffic to LSR B 16, as a directly connected neighbor of egress router 18, for further forwarding by LSR B 16 to egress router 18 using label stacking.

In the example of FIG. 1, at least ingress router 12 and LSR B 16 are capable of supporting the LDP extensions for neighbor-labels. For example, each of the neighbor-label capable routers in network 10 uses the LDP extensions to advertise its support of neighbor-labels to its LDP peer routers during establishment of the LDP sessions. Each of the routers in network 10 also receives advertisements of neighbor-label support from neighbor-label capable LDP peer routers. The LDP extensions are described in more detail with respect to Neighbor-Label Capability parameter 120 of FIG. 5, Neighbor-Label Mapping Message 122 of FIG. 6A, Neighbor FEC parameter 124 included in Neighbor-Label Mapping Message 122 of FIG. 6B, Neighbor-Label Withdraw Message 126 of FIG. 7A, and Neighbor-Label Release Message 128 of FIG. 7B.

According to the techniques of the disclosure, ingress router 12 may run an enhanced remote LFA algorithm to calculate alternate next hops to reach LSR B 16, which is a directly connected neighbor to egress router 18. Unlike conventional remote LFA algorithms that determine alternate next hops toward a destination router, the enhanced remote LFA algorithm determines alternate next hops to routers having direct connections to the destination router.

In the example of FIG. 1, LSR B 16 allocates neighbor-labels for its directly connected neighbor routers, e.g., neighbor-label L1 for egress router 18 and neighbor-label L2 for LSR A 14. LSR B 16 then installs neighbor-label forwarding state for each of the allocated neighbor-labels in forwarding information. For example, LSR B 16 uses the allocated neighbor-label L1 for egress router 18 to establish alternate LSP 28 between LSR B 16 and egress router 18. In this way, LSR B 16 is configured to label switch traffic received with the neighbor-label L1 for egress router 18 onto the direct link to the egress router 18, regardless of the link metric M4. LSR B 16 may similarly be configured to label switch traffic received with the neighbor-label L2 for LSR A 14 onto the direct link to LSR A 14.

LSR B 16 distributes LDP neighbor-label mapping messages indicating the neighbor-label mappings to its LDP peer routers. Unlike conventional LDP LMMs used to indicate label mappings for FECs destined for the distributing router itself, the LDP neighbor-label mapping messages indicate label mappings for FECs destined for directly connected neighbor routers of the distributing router. The LDP extensions are kept simple by distributing all the neighbor-label mappings that LSR B 16, for example, has allocated to all its LDP peers. In addition, the neighbor-label mapping messages are not propagated hop-by-hop along IGP paths. A distributing router only sends its own neighbor-label mappings to LDP peer routers, and does not propagate its neighbors' neighbor-label mappings, received from its neighbors, to other LDP peer routers. The LDP neighbor-label mapping messages are described in more detail with respect to Neighbor-Label Mapping Message 122 of FIG. 6A.

Due to this limitation on neighbor-label mapping propagation, ingress router 12, which is several hops away from LSR B 16, establishes targeted LDP session 26 to learn the neighbor-label mappings for egress router 18 distributed by LSR B 16. LSR B 16 distributes the neighbor-label mappings on all LDP sessions, including targeted LSP sessions. For example, LSR B 16 distributes neighbor-label mapping messages indicating the neighbor-label mapping between label L1 and egress router 18 and the neighbor-label mapping between label L2 and LSR A 14 to LDP peer LSR A 14 over the direct session and to LDP peer ingress router 12 over targeted session 26. Upon receipt of the neighbor-label mapping messages from LSR B 16, each of ingress router 12 and LSR A 14 stores the indicated neighbor-label mappings. In addition, after storing the indicated neighbor-label mappings, each of ingress router 12 and LSR A 14 drops the neighbor-label mapping messages and does not further forward the messages to other peer routers. Each of the other routers in network 10, i.e., ingress router 12, LSR A 14, and egress router 18, may similarly allocate neighbor-labels for its directly connected neighbor routers and distribute neighbor-label mapping messages to all its LDP peers.

According to the techniques of this disclosure, when link 17 between ingress router 12 and egress router 18 fails, ingress router 12 sends backup traffic for egress router 18 including neighbor-label L1 to LSR B 16 along LSP 27. Ingress router 12 encapsulates the traffic with a top label (level 2) as a label for the FEC of LSP 27 destined for LSR B 16, and a bottom label (level 1) as the neighbor-label L1 for egress router 18 advertised by LSR B 16. Upon receipt of the traffic from ingress router 12, LSR B 16 pops the top label. LSR B 16 then forwards the traffic to egress router 18 along LSP 28, regardless of the link metric M4. More specifically, LSR B 16 label switches the traffic received with the neighbor-label L1 for egress router 18 onto the direct link to egress router 18 in accordance with the neighbor-label state for the neighbor-label L1 installed in the forwarding information of LSR B 16. In this way, ingress router 12 and LSR B 16 can use the techniques of this disclosure to nest LSPs 27 and 28 to establish a segmented LSP tunnel to reach egress router 18 using the neighbor-label L1, thereby providing backup coverage for ingress router 12 to forward traffic to egress router 18 in the event of a failure of link 17.

As described above, without the techniques of this disclosure, ingress router 12 does not have backup coverage for forwarding traffic of FECs destined for egress router 18 in the event of a failure of link 17. In the conventional case, ingress router 12 also does not have backup coverage for forwarding traffic of any other FECs destined for routers behind egress router 18. According to the techniques of this disclosure, ingress router 12 may also establish a targeted LDP session to egress router 18 to learn the per prefix label mappings of egress router 18. In this case, for all the other FECs behind egress router 18, ingress router 12 constructs a label stack for network traffic that includes: a label (level 3) for the FEC of LSP 27 to LSR B 16, the neighbor-label L1 (level 2) for egress router 18 advertised by LSR B 16, and a label (level 1) for a FEC destined for a router behind egress router 18 advertised by egress router 18, and applies this label stack to traffic being forwarded for the FEC behind egress router 18.

In an example of a mixed deployment of LDP and RSVP in network 10, a RSVP LSP may be set up between ingress router 12 and egress router 18 to avoid the protected link 17 and achieve similar functionality using labels advertised for FECs behind egress router 18 over the targeted session between ingress router 12 and egress router 18.

For the enhanced remote LFA algorithm used with the neighbor-label distribution described herein, the remote LFA calculation may be changed. As an example, in the enhanced remote LFA calculation, even if none of the nodes in the network topology are in a PQ-space, but rather only in P-space and Q-space, and the node in the P-space can reach one of the nodes in the Q-space via a neighbor-label, the node in the Q-space will be considered as a PQ node. As used in this disclosure, P-space is the set of routers (or network devices, generally) reachable from a specific router (S) without any path (including equal cost path splits) transiting the protected link. Extended P-space is defined as the union of the P-space of the neighbors of a specific router with respect to the protected link. That is, extended P-space(S): P-space(S)+P-space (router other than primary neighbor). Q-space is defined as the set of routers from which a specific router can be reached without any path (including equal cost path splits) transiting the protected link. PQ node is defined as a node which is a member of both the extended P-space and the Q-space. The set of PQ nodes of S are candidates for the remote LFA node.

In the example of FIG. 1, the techniques of this disclosure use neighbor-labels to determine an alternate path to transmit data from ingress router 12 to egress router 18, which are label edge router (LERs) of network 10. In other examples, the techniques of this disclosure may use neighbor-labels to determine alternate paths to transmit data between any upstream LSR and downstream LSR that are capable of supporting the LDP extensions for neighbor-labels.

Figure 2:
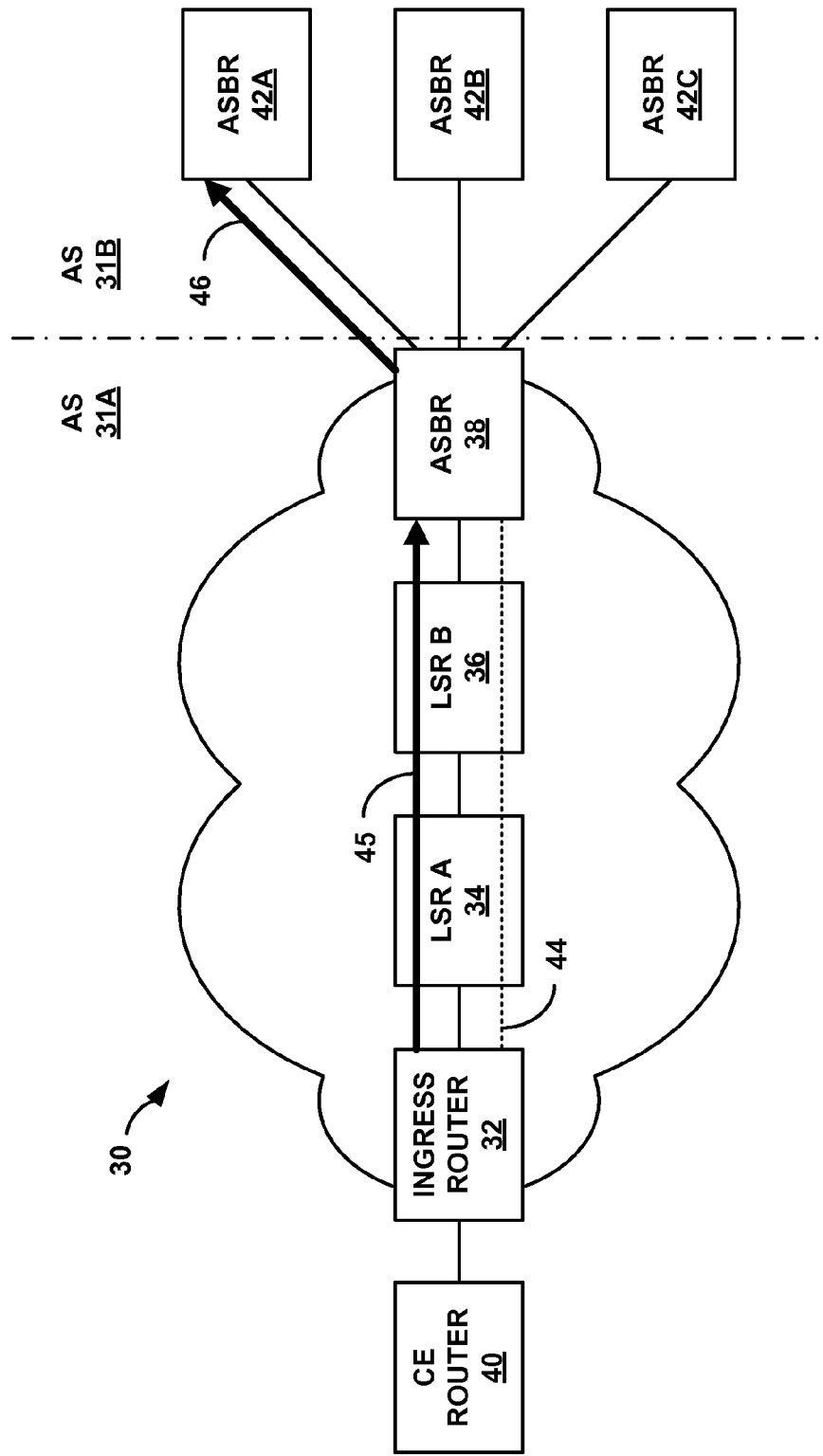
FIG. 2 is a block diagram illustrating another example network including routers configured to provide remote link selection using neighbor-labels distributed with LDP.

FIG. 2 is a block diagram illustrating another example network 30 including routers configured to provide remote link selection using neighbor-labels distributed with LDP. As illustrated in FIG. 2, network 30, within a first autonomous system (AS) 31A, includes an ingress router 32, a LSR A 34, a LSR B 36 and an autonomous system border router (ASBR) 38. Ingress router 32 is connected to customer edge (CE) router 40, which may be connected to one or more customer devices (not shown) to provide access to network 30. As illustrated in FIG. 2, ASBR 38 of network 30 is connected to each of ASBRs 42A-42C ("ASBRs 42") within a second AS 31B via a separate direct link.

Similar to the routers in network 10 of FIG. 1, the routers in network 30 exchange routing information using a link-state routing protocol of IGP, process the routing information to calculate next hops to reach other routers in network 30, and install the next hops in forwarding information for forwarding network traffic destined for the other routers. In addition, network 30 may have a similar architecture as that described for network 10 from FIG. 1. For example, network 30 may comprise an IP network that uses MPLS mechanisms to transport packets across network 30. The routers in network 30 use LDP LMMs to distribute labels to other routers along hop-by-hop IGP paths to establish LSPs. In the example of FIG. 2, ASBR 38 distributes a LDP LMM to LSR B 36, which distributes a LDP LMM to LSR A 34, which distributes a LDP LMM to ingress router 32 along the IGP path to establish LSP 45 between ingress router 32 and ASBR 38.

In the example illustrated in FIG. 2, ASBR 38 in network 30 within AS 31A may exchange routing information with each of ASBRs 42 within AS 31B using a Border Gateway Protocol (BGP) defined to exchange routing information between autonomous systems. However, ingress router 32, LSR A 34 and LSR B 36 in network 30 within AS 31A are unable to exchange routing information with ASBRs 42 within AS 31B because IGP is generally defined to exchange routing information within a given AS. Conventionally, when ASBR 38 receives traffic for a destination router within AS 31B from ingress router 32 over LSP 45, ASBR 38 selects a link to send traffic to one of ASBRs 42 within AS 31B based on load balancing. Ingress router 32, therefore, has no control over which outgoing link of ASBR 38 that traffic is forwarded on to reach ASBRs 42 within AS 31B.

This disclosure describes extensions to LDP to enable distribution of neighbor-label mappings for directly connected neighbor routers. The neighbor-labels enable traffic to be switched to the directly connected neighbor router irrespective of IGP paths. The techniques of this disclosure include nesting multiple LDP LSPs to establish a segmented LSP tunnel to reach a destination router using the neighbor-label to improve fast re-route coverage and load balancing in MPLS networks. In the example of FIG. 2, the techniques of this disclosure enable ingress router 32 within first AS 31A to select a particular remote link on which to send traffic for remote ASBRs 42 within a second AS 31B. In this way, the techniques may increase link utilization and improve load balancing between the remote links.

In the example of FIG. 2, at least ingress router 32 and ASBR 38 are capable of supporting the LDP extensions for neighbor-labels. ASBR 38 within AS 31A allocates neighbor-labels for each of its directly connected neighbor ASBRs 42 within 31B. ASBR 38 then installs neighbor-label forwarding state for each of the allocated neighbor-labels in forwarding information. For example, ASBR 38 uses the allocated neighbor-label for ASBR 42A to establish LSP 46 between ASBR 38 and ASBR 42A. In this way, ASBR 38 within AS 31A is configured to label switch traffic received with the neighbor-label for ASBR 42A onto the direct link to ASBR 42A regardless of the link metrics.

ASBR 38 within AS 31A distributes LDP neighbor-label mapping messages indicating the external neighbor-label mappings for each of directly connected neighbor ASBRs 42 within AS 31B to its LDP peer routers in AS 31A. In this example, ingress router 32 establishes a targeted LSP session 44 to ASBR 38 to learn the external neighbor-label mappings for ASBRs 42 advertised by ASBR 38. Upon receipt of the neighbor-label mapping messages from ASBR 38, ingress router 32 stores the indicated external neighbor-label mappings for ASBRs 42. In addition, ingress router 32 drops the external neighbor-label mapping messages and does not further forward the messages to other peer routers.

The external neighbor-label mappings enable ingress router 32 to send traffic to ASBR 38, as a directly connected neighbor of ASBRs 42, for further forwarding by ASBR 38 to one of ASBRs 42 using label stacking According to the techniques of this disclosure, ingress router 32 sends traffic for a particular one of ASBRs 42 within AS 31B, e.g., ASBR 42A, including the neighbor-label for ASBR 42A to ASBR 38 within AS 31A along LSP 45. Ingress router 32 encapsulates the traffic with a top label (level 2) as a label for the FEC of LSP 45 destined for ASBR 38, and a bottom label (level 1) as the neighbor-label for ASBR 42A advertised by ASBR 38.

Upon receipt of the traffic from ingress router 32, ASBR 38 within AS 31A pops the top label. ASBR 38 then forwards the traffic to ASBR 42A along LSP 46 regardless of the link metrics. More specifically, ASBR 38 label switches the traffic received with the neighbor-label for ASBR 42A onto the direct link to ASBR 42A in accordance with the neighbor-label state for the neighbor-label installed in the forwarding information. In this way, the techniques of this disclosure nest LSPs 45 and 46 to establish a segmented LSP tunnel to reach remote ASBR 42A within AS 31B using the neighbor-label for ASBR 42A to provide remote link selection to ingress router 32 within AS 31A.

Figure 3:
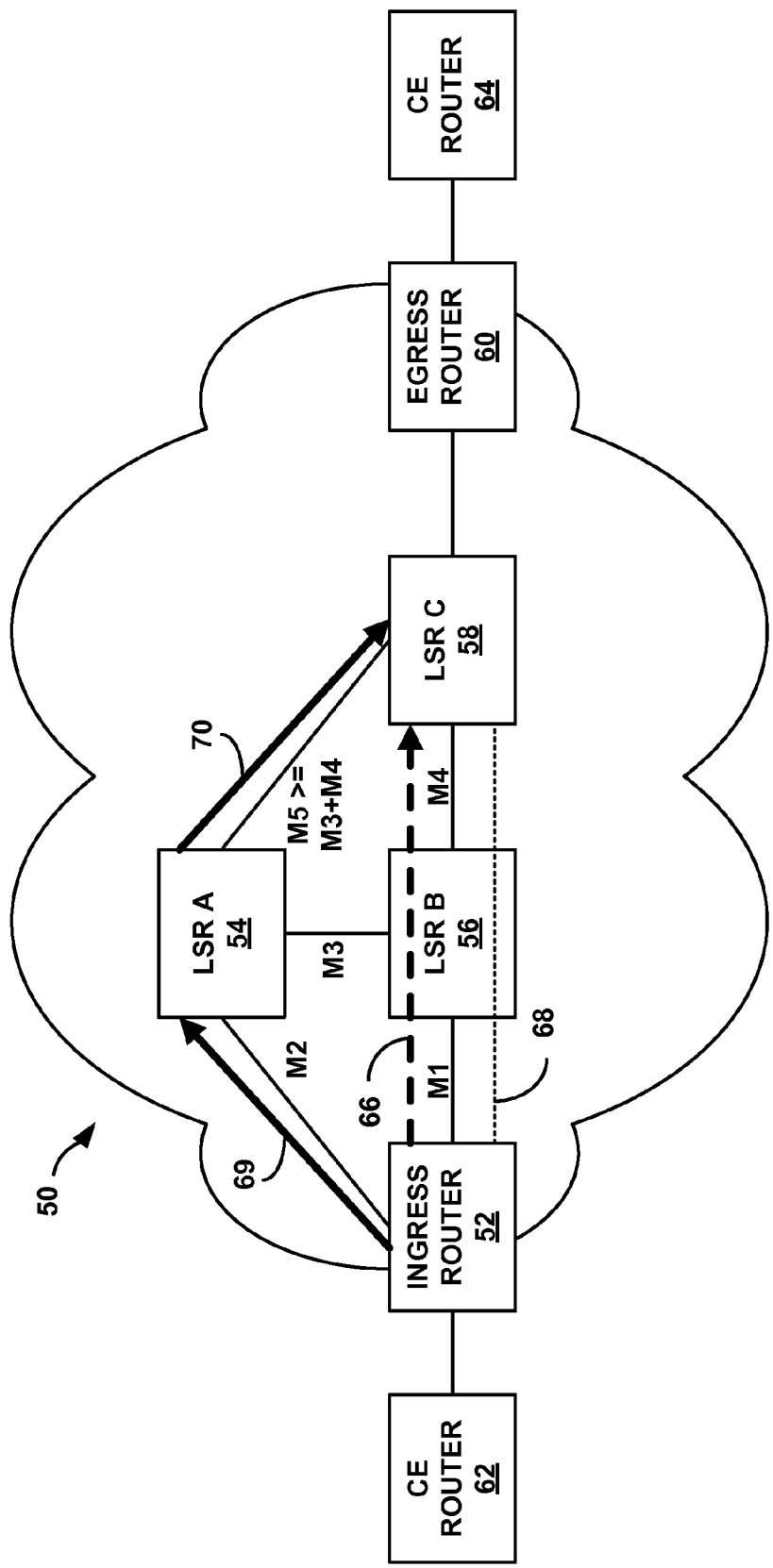
FIG. 3 is a block diagram illustrating another example network including routers configured to provide node protection using neighbor-labels distributed with LDP.

FIG. 3 is a block diagram illustrating another example network 50 including routers configured to provide node protection using neighbor-labels distributed with LDP. As illustrated in FIG. 3, network 50 includes an ingress router 52, a LSR A 54, a LSR B 56, a LSR C 58, and an egress router 60. Ingress router 52 is connected to CE router 62, and egress router 60 is connected to CE router 64. Each of CE routers 62 and 64 may be connected to one or more customer devices (not shown) to provide access to network 50.

Similar to the routers in network 10 from FIG. 1, the routers in network 50 exchange routing information using a link-state routing protocol of IGP, process the routing information to calculate primary next hops to reach other routers in network 50, and install the primary next hops in forwarding information for forwarding network traffic destined for the other routers. These primary next hops are used for forwarding network traffic in the absence of any detected network failures. For example, ingress router 52 determines a primary next hop toward LSR C 58 as LSR B 56 along a link having link metric M1. The routers in network 50 may also be configured to calculate and install alternate next hops to each destination router, for use in forwarding network traffic if a failure is detected on a link or node associated with the respective primary next hop. In some cases, the routers in network 50 may calculate the alternate next hops taking into account a LFA path calculation.

As described above, in network 50 ingress router 32 determines a primary next hop toward LSR C 58 as LSR B 56. Ingress router 32, however, cannot determine a LFA next hop to reach LSR C 58 in the event of a failure of LSR B 56. In the illustrated example of FIG. 3, a link between ingress router 52 and LSR B 56 has a link metric M1, the link between ingress router 52 and LSR A 54 has a link metric M2, the link between LSR A 54 and LSR B 56 has a link metric M3, the link between LSR B 56 and LSR C 58 has a link metric M4, and the link between LSR A 54 and LSR C 58 has a link metric M5. In this example, link metric M5 has a value greater than or equal to the sum of link metrics M3 and M4. In the topology of network 50, an IGP alternate path from LSR A 54 toward LSR C 58 would loop back to protected LSR B 56 in order to reach LSR C 58 without using the longest path to LSR C 58 along the link with metric M5. Although LSR A 54 has a direct link to LSR C 58, LSR A 54 cannot act as a LFA next hop toward LSR C 58. Therefore, ingress router 52 does not have backup coverage to reach LSR C 58 in the event of a failure of LSR B 56.

Network 50 may have a similar architecture as that described for network 10 from FIG. 1. For example, network 50 may comprise an IP network that uses MPLS mechanisms to transport packets across network 50. The routers in network 50 use LDP LMMs to distribute labels to other routers along hop-by-hop IGP paths to establish LSPs. In the example of FIG. 3, LSR C 58 distributes a LDP LMM to LSR B 56, which distributes a LDP LMM to ingress router 52 along the IGP primary path to establish primary LSP 66 between ingress router 52 and LSR C 58. In addition, LSR A 54 may distribute a LDP LMM to ingress router 52 to establish LSP 69 between ingress router 52 and LSR A 54.

This disclosure describes extensions to LDP to enable distribution of neighbor-label mappings for directly connected neighbor routers. The neighbor-labels enable traffic to be switched to the directly connected neighbor router irrespective of hop-by-hop IGP paths determined for the network topology. The techniques of this disclosure include nesting multiple LDP LSPs to establish a segmented LSP tunnel to reach a destination router using the neighbor-label to improve fast re-route coverage and load balancing in MPLS networks.

In the example of FIG. 3, the LDP neighbor-label extensions enable ingress router 52 to know its neighbor's neighbor LSR C 58. Ingress router 52 may use this information to establish targeted LDP session 68 to LSR C 58 to provide node protection for LSR B 56. Ingress router 52 may then establish a LSP tunnel to avoid the protected LSR B 56. The LSP tunnel may be a segmented LDP LSP tunnel established to reach LSR C 58 using a neighbor-label for LSR C 58 advertised by LSR A 54, as illustrated in FIG. 3. In other examples, the LSP tunnel may be an automatic RSVP LSP tunnel established to reach LSR C 58 in a mixed deployment of LDP and RSVP in network 50. According to the techniques, if the IGP path does not provide node protection for LSR B 56, ingress router 52 uses one of the LSP tunnels to transport the traffic to LSR C 58 with a bottom label as a per-prefix label learned over targeted session 68 to LSR C 58.

As illustrated in FIG. 3, the primary next hop to reach LSR C 58 along primary LSP 66 is LSR B 56, and due to metric configurations, there is no viable LFA next hop to reach LSR C 58 in the event of a failure of LSR B 56. In the example of FIG. 3, at least ingress router 52, LSR A 54, and LSR C 58 are capable of supporting the LDP extensions for neighbor-labels. According to the techniques, LSR A 54 allocates neighbor-labels for its directly connected neighbor router LSR C 58. LSR A 54 then installs neighbor-label forwarding state for the allocated neighbor-label in forwarding information. For example, LSR A 54 uses the allocated neighbor-label for LSR C 58 to establish LSP 70 between LSR A 54 and LSR C 58. In this way, LSR A 54 is configured to label switch traffic received with the neighbor-label for LSR C 58 onto the direct link to LSR C 58 regardless of the link metrics. LSR A 54 then distributes LDP neighbor-label mapping messages indicating the neighbor-label mapping to its LDP peer ingress router 52. Upon receipt of the neighbor-label mapping message from LSR A 54, ingress router 52 stores the indicated neighbor-label mapping for LSR C 58. In addition, ingress router 52 drops the neighbor-label mapping message and does not further forward the messages to other peer routers.

The neighbor-label mappings enable ingress router 52 to send traffic to LSR A 54, as a directly connected neighbor of LSR C 58, for further forwarding by LSR A 54 to LSR C 58 using label stacking According to the techniques of this disclosure, when LSR B 56 fails, ingress router 52 sends traffic including the neighbor-label for LSR C 58 to LSR A 54 along LSP 69. Due to the LDP neighbor-label extensions, ingress router 52 knows about its neighbor's neighbor LSR C 58, and establishes targeted session 68 to LSR C 58 to learn per-prefix labels for LSR C 58. In this case, ingress router 52 constructs a label stack to provide node protection to LSR B 56 that includes: a label (level 3) for the FEC of LSP 69 destined for LSR A 54, the neighbor-label (level 2) for LSR C 58 advertised by LSR A 54, and a label (level 1) advertised for LSR C 58 over targeted session 68 between ingress router 52 and LSR C 58.

Upon receipt of the traffic from ingress router 52, LSR A 54 forwards the traffic to LSR C 58 along LSP 70 regardless of the link metrics. More specifically, LSR A 54 label switches the traffic received with the neighbor-label for LSR C 58 onto the direct link to LSR C 58 in accordance with the neighbor-label state for the neighbor-label installed in the forwarding information. In this way, the techniques of this disclosure nest LSPs 69 and 70 to establish a segmented LDP LSP tunnel to reach LSR C 58 using the neighbor-label for LSR C 58 to provide backup coverage to ingress router 52 in the event of a failure of LSR B 56.

In an example of a mixed deployment of LDP and RSVP in network 50, a RSVP LSP may be set up between ingress router 52 and LSR C 58 to avoid the protected LSR B 56. In this case, ingress router 52 constructs a label stack to provide node protection to LSR B 56 that includes: a RSVP LSP label (level 2) for LSR C 58, and a label (level 1) advertised for LSR C 58 over targeted session 68 between ingress router 52 and LSR C 58.

Figure 4:
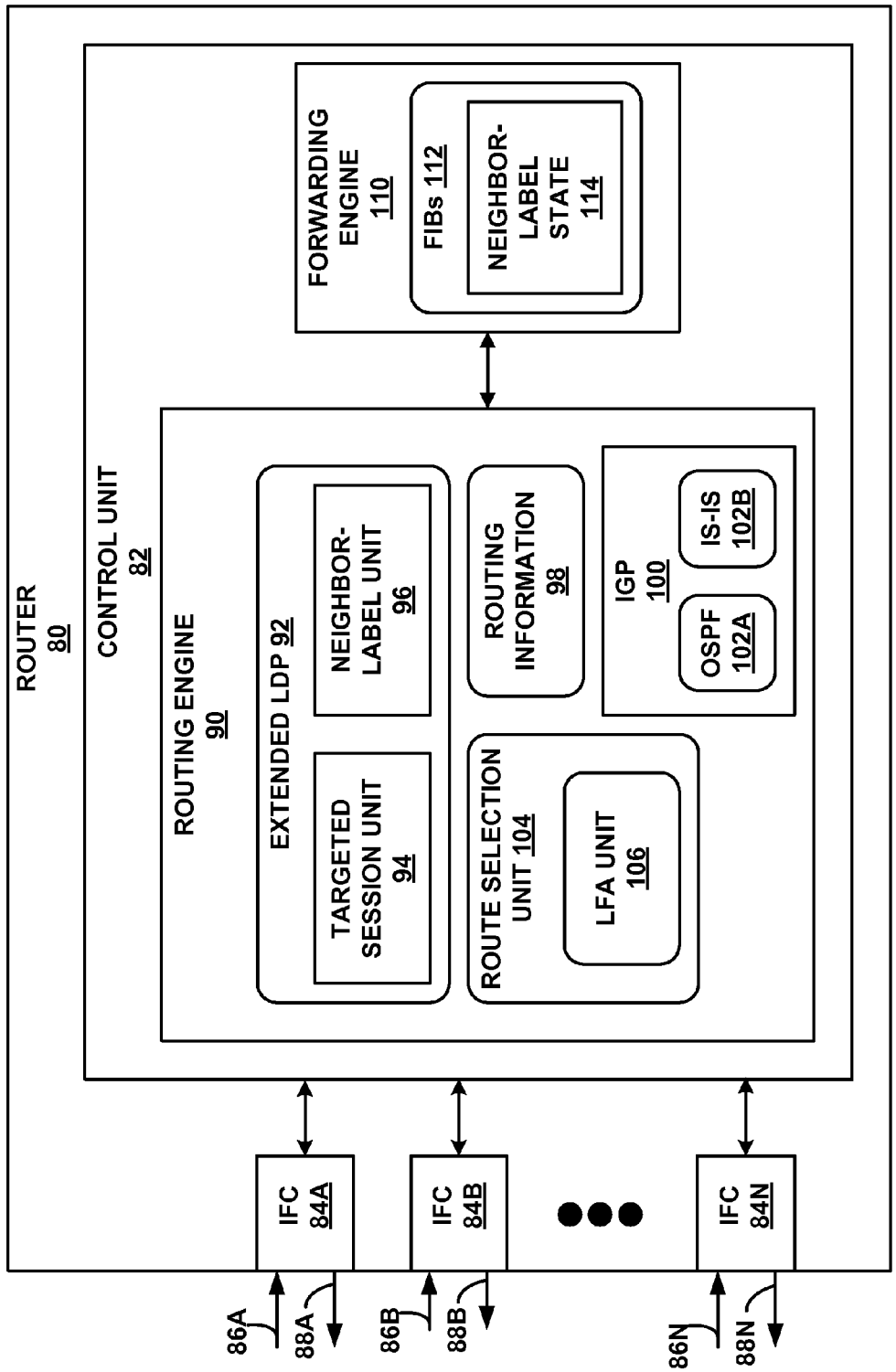
FIG. 4 is a block diagram illustrating an example router capable of supporting neighbor-labels.

FIG. 4 is a block diagram illustrating an example router 80 capable of supporting neighbor-labels. Router 80 may comprise any router in a network, such as networks 10, 30 or 50. For example, router 80 may comprise any LSR or any LER, e.g., ingress routers, egress routers, and ASBRs, illustrated in FIGS. 1-3. In the example of FIG. 4, router 80 includes interface cards 84A-84N (IFCs 84), for communicating packets via inbound links 86A-86N ("inbound links 86") and outbound links 88A-88N ("outbound links 88"). IFCs 84 are coupled to inbound links 86 and outbound links 88 via a number of interface ports (not shown).

Router 80 also includes a control unit 82, which includes a routing engine 90 and a forwarding engine 110. Routing engine 90 is responsible for maintaining and updating routing information 98. Routing information 98 may describe a topology of a network, and more particularly, routes through the network. For example, routing information 98 may include route data that describes various routes through the network, and also next hop data indicating appropriate neighboring devices within the network for each of the routes. Routing engine 90 is configured to implement IGP 100 including the link-state routing protocols of OSPF 102A and IS-IS 102B to exchange routing information 98 with other routers in the network. In this way, routing engine 90 periodically updates routing information 98 to accurately reflect the current network topology.

Routing engine 90 implements various protocols that may comprise software processes having instructions executed by a computing environment. According to the techniques of this disclosure, routing engine 90 implements extended LDP 92 to allocate neighbor-labels for directly connected neighbor routers of router 80, and to distribute the neighbor-label mappings to LDP peer routers of router 80. The neighbor-label mapping messages and procedures are described in more detail with respect to FIGS. 6A and 6B.

Routing engine 90 may also use extended LDP 92 to negotiate support of the neighbor-label procedures with the LDP peer routers of router 80, including sending a neighbor-label capability advertisement to each of the LDP peer routers indicating that router 80 supports the neighbor-label procedures, and receiving neighbor-label capability advertisements from at least one of the LDP peer routers indicating support of the neighbor-label procedures. This is negotiation described in more detail with respect to Neighbor-Label Capability parameter 120 from FIG. 5. Routing engine 90 may further use extended LDP 92 to withdraw previously distributed neighbor-label mappings for a neighbor router from the LDP peer routers. In response to receiving a neighbor-label withdraw message, routing engine 90 may use extended LDP 92 to release previously received neighbor-label mappings from the LDP peer routers. The neighbor-label withdraw and release procedures are described in more detail with respect to FIGS. 7A and 7B.

Routing engine 90 may also use extended LDP 92 to perform additional neighbor-label procedures described in this disclosure. As another example, extended LDP 92 includes a targeted session unit 94 used to establish targeted LDP session with non-neighbor LDP peer routers of router 80. The targeted sessions enable router 80 to receive any neighbor-label mappings distributed by the non-neighbor LDP peer routers. As another example, extended LDP 92 includes a neighbor-label unit 96 used to store neighbor-label mappings received by router 80 from LDP peer routers in the network. Upon receiving the neighbor-label mappings, neighbor-label unit 96 drops the neighbor-label mapping messages to not forward the messages to other peer routers in the network. Routing engine 90 may look-up the neighbor-label mappings stored in neighbor-label unit 96 to determine which neighbor-label to include in a label stack when sending traffic to a LDP peer router of router 80 for further forwarding to a directly connected neighbor router based on the neighbor-label.

Routing engine 90 includes a route selection unit 104 configured to select between different available routes through the network based on IGP 100 and routing information 98. Routing engine 90 may use route selection unit 104 to calculate primary next hops towards a destination router taking into account a common shortest path algorithm. In some cases, routing engine 90 may also use LFA unit 106 to perform a LFA calculation or a remote LFA calculation to calculate alternate next hops toward the destination router in the case of a failure on a link or node associated with the respective primary next hop. According to the techniques of this disclosure, in the case where no LFA next hops toward a destination router are available based on the link metrics of the network, LFA unit 106 may perform an enhanced remote LFA algorithm that selects a remote LFA next hop based at least in part on paths to routers having direct connections to the destination router, instead of selecting an LFA next hop based on alternate paths to the destination router itself.

Routing engine 90 analyzes its stored routing information 98 and generates forwarding information for use by forwarding engine 110. Forwarding engine 110 stores the forwarding information for router 80 in various forwarding information bases (FIBs) 112. Forwarding engine 110 may maintain separate FIBs 112 respectively associated with, for example, different VPNs or LSPs in the network. Control unit 82 may therefore select the appropriate one of FIBs 112 used to switch incoming traffic based on a mapping of the interface ports of IFCs 84 to FIBs 112. FIBs 112 associate, for example, network destinations with specific next hops and corresponding IFCs 84. Each of the FIBs 112 also stores label information that includes an incoming label, an outgoing label, and a next hop for a packet.

As described above, routing engine 90 may use route selection unit 104 to process routing information 98 to calculate next hops to reach other routers in the network and install the primary next hops in FIBs 112 for forwarding network traffic destined for the other routers. In some cases, routing engine 90 may use LFA unit 106 to further process routing information 98 to calculate alternate next hops to the other routers, and install the alternate next hops in FIBs 112 for forwarding network traffic if a failure is detected on a link or node associated with the respective primary next hop.

According to the techniques of this disclosure, forwarding engine 110 may also store neighbor-label forwarding state 114 in each of FIBs 112. Neighbor-label forwarding state 114 associates neighbor-labels allocated for directly connected neighbor routers of router 80 with outbound links 88 of IFCs 84 to the respective neighbor routers. Forwarding engine 110 uses neighbor-label forwarding state 114 to switch incoming traffic including one of the neighbor-labels onto the associated one of outbound link 88 directly connected to the respective neighbor router.

The architecture of router 80 illustrated in FIG. 4 is shown for exemplary purposes only. This disclosure is not limited to this architecture. In other examples, router 80 may be configured in a variety of ways. In one example, some of the functionally of control unit 82 may be distributed within IFCs 84. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein.

Control unit 82 may further include one or more processors which execute software instructions stored on a computer-readable medium, such as a computer-readable storage medium. In some instances, the computer-readable medium may include instructions that cause a programmable processor to perform the techniques described herein when the instructions are executed. Computer-readable media may include non-transitory computer-readable storage media and transient communication media. Computer-readable storage media, which is tangible and non-transitory, may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Figure 5:
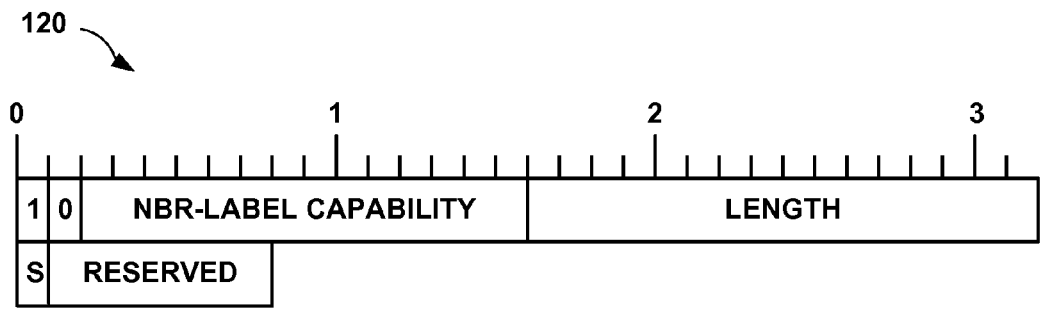
FIG. 5 illustrates an example Neighbor-Label Capability type-length-value (TLV) to indicate whether a router supports neighbor-labels.

FIG. 5 illustrates an example Neighbor-Label Capability type-length-value (TLV) 120 used to indicate whether a router supports neighbor-labels. In accordance with techniques of this disclosure, neighbor-label capability is negotiated between LDP peer routers using Neighbor-Label Capability TLV 120 advertised in LDP Initialization or Capability messages. The usage of LDP Initialization or Capability messages implies that a router may negotiate neighbor-label capability with a LDP peer router before sending or receiving any other LDP messages with that peer router. The newly defined Neighbor-Label Capability TLV 120 may indicate the capability of a sending router to support neighbor-label mapping, withdraw, and release procedures. If a receiving peer router has not advertised the corresponding neighbor-label capability, then the Neighbor-Label Mapping Messages should not be sent to the peer router.

As shown in FIG. 5, Neighbor-Label Capability TLV 120 includes a TLV type field (in this case Neighbor-Label Capability), a length field, and a state bit (S). The state bit indicates whether the capability specified by the TLV type is being advertised or withdrawn. The reserved bits may be set to zero on transmission and ignored on receipt. More information about advertising LDP Capabilities may be found in Thomas, B., "LDP Capabilities," RFC 5561, July 2009, the entire contents of which are incorporated by reference herein.

Figure 6A:
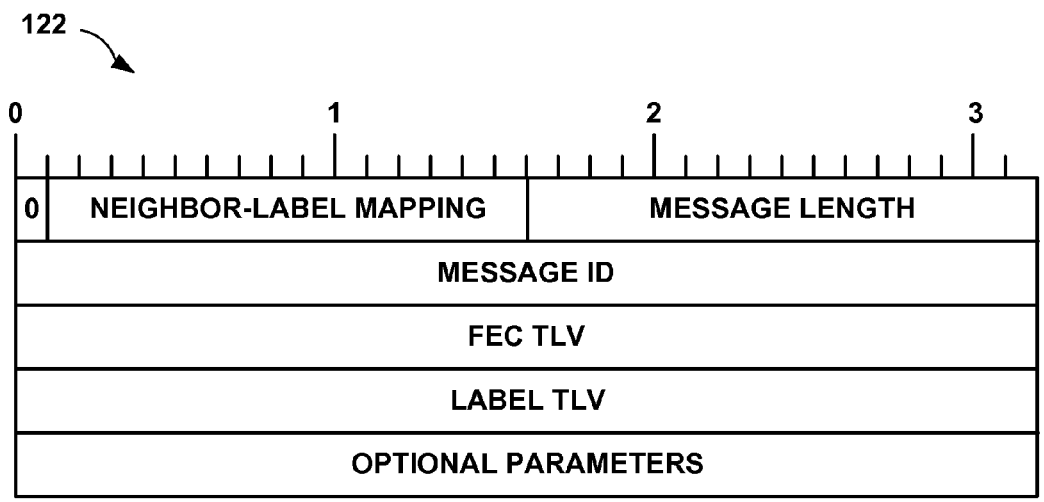
FIG. 6A illustrates an example Neighbor-Label Mapping Message used to advertise neighbor-label mappings to LDP peer routers.

FIG. 6A illustrates an example Neighbor-Label Mapping Message 122 used to advertise neighbor-label mappings to LDP peer routers. In accordance with the techniques of this disclosure, a router distributes Neighbor-Label Mapping Message 122 to one or more neighbor-label capable LDP peer routers to advertise a mapping between a neighbor forwarding equivalence class (FEC) and a label allocated for the neighbor FEC. The router does not send Neighbor-Label Mapping Message 122 to a peer router if the peer router did not advertise the Neighbor-Label Capability TLV 120 of FIG. 4 in LDP Initialization or Capability messages. Upon receipt of Neighbor-Label Mapping Message 122, the receiving peer router stores the neighbor-label mapping and then drops the message without forwarding the message to other peer routers.

In one example, when a router distributes a neighbor-label mapping for a neighbor router to multiple LDP peer routers, the sending router may map a single label to the neighbor FEC and distribute the single mapping to all the receiving peer routers using Neighbor-Label Mapping Message 122. In another example, when a router distributes a neighbor-label mapping for a neighbor FEC to multiple LDP peer routers, the sending router may map a different label to the neighbor FEC for each of the receiving peer routers. In this case, the sending router may distribute each of the different neighbor-label mappings to each of the receiving peer routers using a Neighbor-Label Mapping Message 122. In either case, the sending router is responsible for the consistency of the distributed neighbor-label mappings and for ensuring that the receiving peer routers have the neighbor-label mappings. A peer router receiving a Neighbor-Label Mapping Message 122 from a sending downstream router for a neighbor router should not use the neighbor-label unless a route prefix next-next hop is the neighbor router address.

Figure 6B:
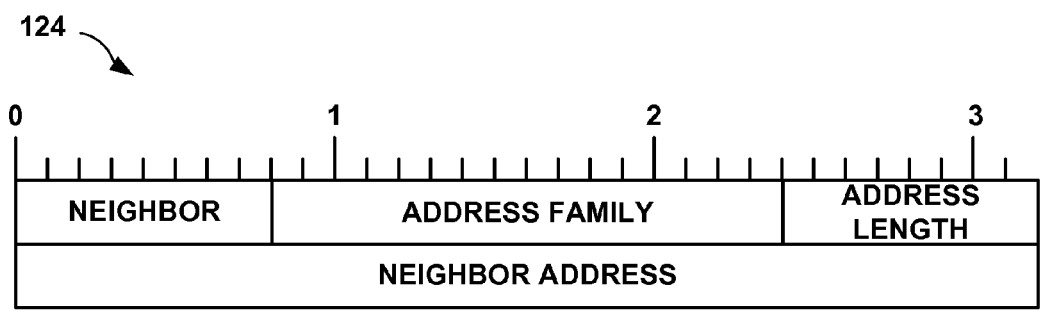
FIG. 6B illustrates an example Neighbor FEC TLV included in the Neighbor-Label Mapping Message of FIG. 6A to specify the neighbor component of the advertised neighbor-label mapping.

The encoding for Neighbor-Label Mapping Message 122 may be similar to the encoding for a standard LDP Label Mapping Message (LMM). As shown in FIG. 6, Neighbor-Label Mapping Message 122 includes a type field (in this case Neighbor-Label Mapping), a message length field, a message ID field, a FEC TLV field to identify a particular neighbor FEC, a Label TLV field to indicate a label mapped to the neighbor FEC, and an optional parameters field. The Neighbor FEC TLV is described in more detail with respect to FIG. 6B. The Label TLV specifies the label component of the neighbor-label mapping. More information about the encoding of a Label TLV may be found in Andersson, L., Ed., "LDP Specification," RFC 5036, October 2007, the entire contents of which are incorporated by reference herein.

In some examples, the optional parameters field of Neighbor-Label Mapping Message 122 may be defined to include a Neighbor Location TLV to indicate whether the particular neighbor identified in the FEC TLV field is located internal or external to an autonomous system (AS) of the sending router. The Neighbor Location TLV may be used to provide remote link selection to an ingress router as illustrated in FIG. 2.

FIG. 6B illustrates an example Neighbor FEC TLV 124 included in the Neighbor-Label Mapping Message of FIG. 6A to specify the neighbor component of the advertised neighbor-label mapping. As shown in FIG. 6B, Neighbor FEC TLV 124 includes a TLV type field (in this case Neighbor), an address family field, an address length field, and a neighbor address field to indicate a neighbor address prefix for the neighbor router. The address family field indicates the address family for the neighbor address prefix specified in the neighbor address field. The address length field indicates the length in bits of the neighbor address prefix specified in the neighbor address field. A length of zero bits indicates that the neighbor address prefix matches all neighbor router addresses from the LDP peer router.

Figure 7A:
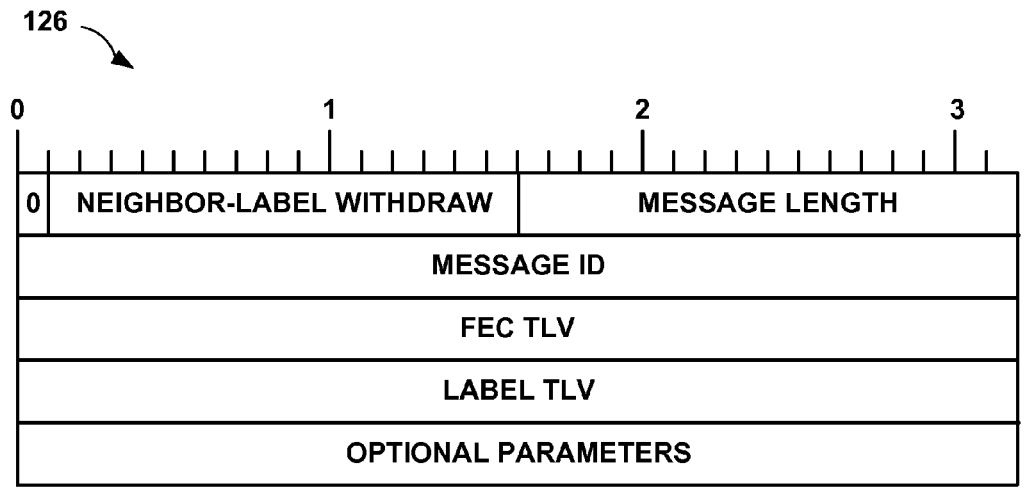
FIG. 7A illustrates an example Neighbor-Label Withdraw Message used to indicate that LDP peer routers should no longer use one or more previously advertised neighbor-label bindings.

FIG. 7A illustrates an example Neighbor-Label Withdraw Message 126 used to indicate that LDP peer routers should no longer use one or more previously advertised neighbor-label mappings. Upon receipt of the Neighbor-Label Withdraw Message 126, a peer router breaks the mappings between the indicated neighbor FECs and the labels. A peer router that receives Neighbor-Label Withdraw Message 126 responds to the sending router with a Neighbor-Label Release Message 128 described in more detail in FIG. 7B.

In one example, a router transmits Neighbor-Label Withdraw Message 126 to one or more peer routers when the sending router is no longer adjacent to a previously known neighbor router for which a label was previously advertised. In another example, a router transmits Neighbor-Label Withdraw Message 126 to one or more peer routers when the sending router is unilaterally configured to no longer label switch a neighbor FEC with the neighbor-label mapping being withdrawn.

As shown in FIG. 7A, Neighbor-Label Withdraw Message 126 includes a type field (in this case Neighbor-Label Withdraw), a message length field, a message ID field, a FEC TLV field to identify a particular neighbor FEC for which the neighbor-label mapping is being withdrawn, an optional Label TLV field, and an optional parameters field. In the example where no Label TLV is included in Neighbor-Label Withdraw Message 126 following the Neighbor FEC TLV, all labels associated with the identified neighbor FEC are withdrawn. In other examples where a Label TLV is included in Neighbor-Label Withdraw Message 126 following the Neighbor FEC TLV, only the specified label for the identified neighbor FEC is withdrawn.

In some cases, the Neighbor FEC TLV may contain a Wildcard Neighbor FEC Element. In that case, Neighbor FEC TLV may contain no other FEC Elements. If the optional Label TLV is not included in the Neighbor-Label Withdraw Message 126, then all neighbor-label mappings previously advertised by the sending router to the receiving peer router are withdrawn. More information about the Wildcard FEC Element may be found in Asati, R., "Label Distribution Protocol (LDP) 'Typed Wildcard' Forward Equivalence Class (FEC)," RFC 5918, August 2010, the entire contents of which are incorporated by reference herein.

Figure 7B:
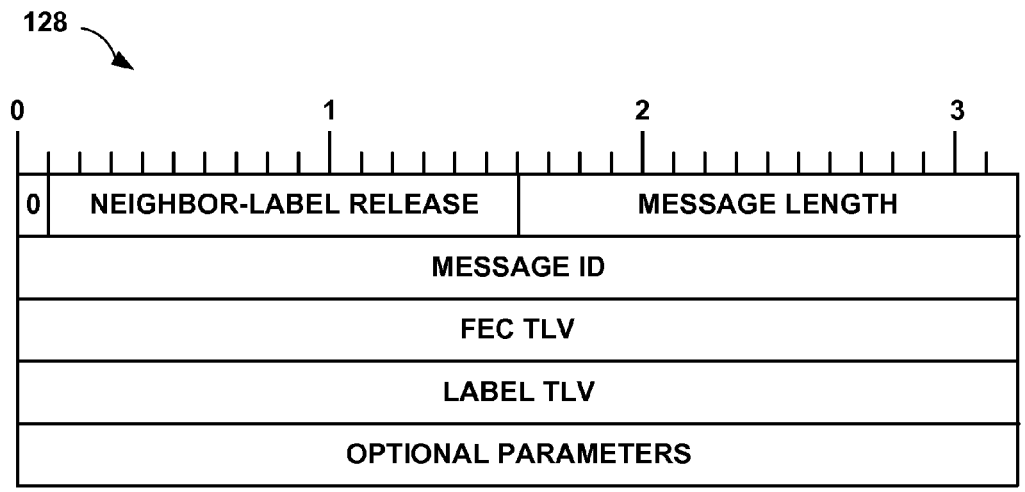
FIG. 7B illustrates an example Neighbor-Label Release Message used to indicate that a LDP peer router no longer needs one or more previously advertised neighbor-label bindings.

FIG. 7B illustrates an example Neighbor-Label Release Message 128 used to indicate that a LDP peer router no longer needs one or more previously advertised neighbor-label mappings. A router transmits Neighbor-Label Release Message 128 to a peer router in response to receiving Neighbor-Label Withdraw Message 126 from the receiving peer router. The sending router no longer needs the withdrawn neighbor-label mappings, and sends Neighbor-Label Release Message 128 to the receiving peer router.

As shown in FIG. 7B, Neighbor-Label Release Message 128 includes a type field (in this case Neighbor-Label Release), a message length field, a message ID field, a FEC TLV field to identify a particular neighbor FEC for which the neighbor-label mapping is being released, an optional Label TLV field, and an optional parameters field. In the example where no Label TLV is included in Neighbor-Label Release Message 128 following the Neighbor FEC TLV, all labels associated with the identified neighbor FEC are released. In other examples where a Label TLV is included in Neighbor-Label Release Message 128 following the Neighbor FEC TLV, only the specified label for the identified neighbor FEC is released.

In some cases, the Neighbor FEC TLV may contain a Wildcard Neighbor FEC Element. In that case, Neighbor FEC TLV may contain no other FEC Elements. If the optional Label TLV is not included in the Neighbor-Label Release Message 128, then the sending router releases all neighbor-label mappings previously learned from the receiving peer router. More information about the Wildcard FEC Element may be found in Asati, R., "Label Distribution Protocol (LDP) 'Typed Wildcard' Forward Equivalence Class (FEC)," RFC 5918, August 2010, the entire contents of which are incorporated by reference herein.

Figure 8:
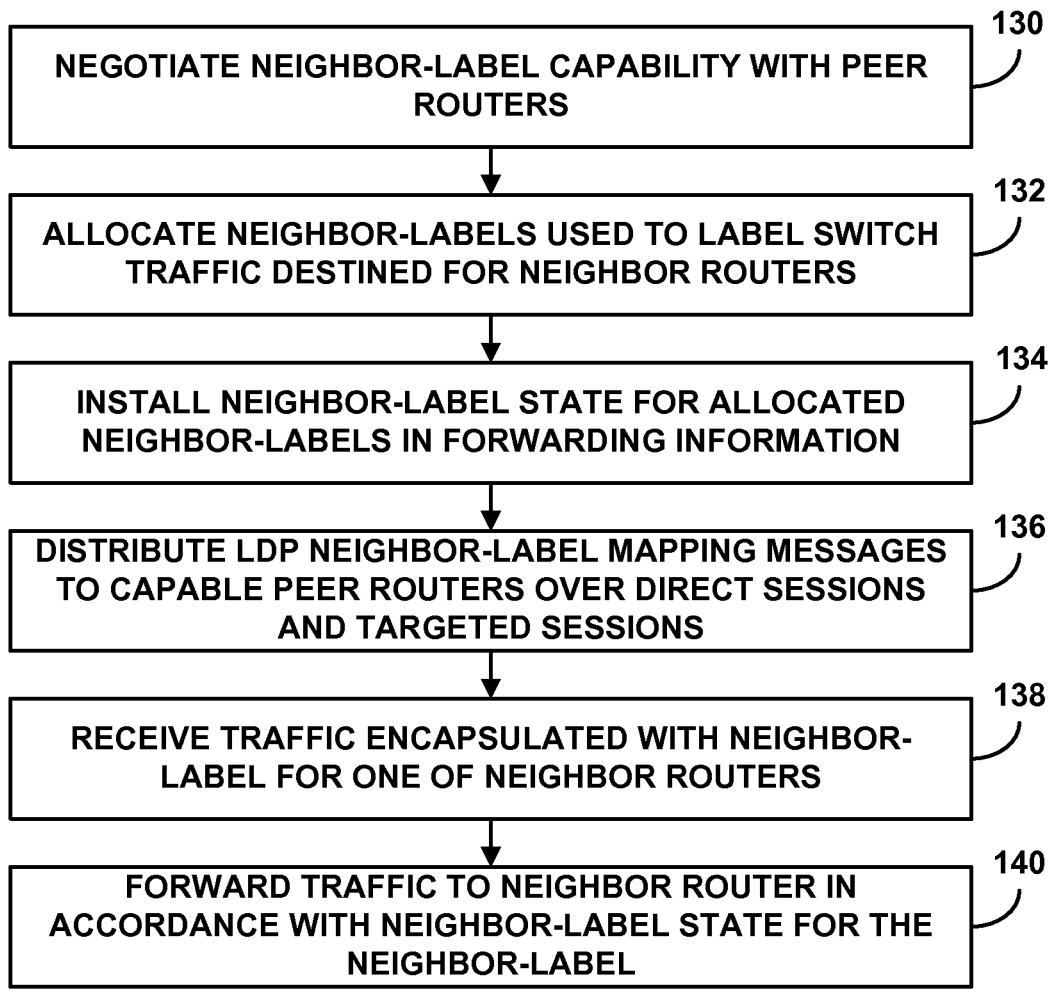
FIG. 8 is a flowchart illustrating an example operation of distributing LDP Neighbor-Label Mapping Messages to LDP peer routers and forwarding traffic to directly connected neighbor routers based on the neighbor-labels.

FIG. 8 is a flowchart illustrating an example operation of distributing LDP Neighbor-Label Mapping Messages to LDP peer routers and forwarding traffic to directly connected neighbor routers based on the neighbor-labels. The example operation is described herein with respect to LSR B 16 distributing a neighbor-label for egress router 18 to ingress router 12 from FIG. 1. In other examples, the operation of FIG. 8 may be performed by any downstream LDP peer router that is a directly connected neighbor of a destination router. As one example, the operation of FIG. 8 may be performed by ASBR 38 distributing a neighbor-label for each of inter-AS ASBRs 42 to ingress router 32 from FIG. 2. As another example, the operation of FIG. 8 may be performed by LSR A 54 distributing a neighbor-label for LSR C 58 to ingress router 52 from FIG. 3.

As illustrated in FIG. 1, ingress router 12 has a direct link to egress router 18. Based on the link metrics, primary LSP 24 along the direct link is the only available path from ingress router 12 to egress router 18 in network 10. In this case, ingress router 12 does not have backup coverage to reach egress router 18 via a loop-free alternate path.

According to the techniques of this disclosure, ingress router 12 runs an enhanced Remote LFA algorithm to reach egress router 18 via LSPs 27 and 28 irrespective of the hop-by-hop IGP path determined based on link metrics. LSR B 16 has directly connected neighbor routers of LSR A 14 and egress router 18. Ingress router 12 establishes a targeted LDP session 26 to LSR B 16 in order to learn neighbor-label mappings for egress router 18. In this case, LSR B 16 has LDP peer routers of LSR A 14 and egress router 18 over direct sessions, and ingress router 12 over targeted session 26.

LSR B 16 negotiates neighbor-label capability with its peer routers (130). LSR B 16 advertises its support of neighbor-labels using Neighbor-Label Capability parameter 120 included in LDP Initialization or Capability messages sent to its peer routers during establishment of the LDP sessions. LSR B 16 also receives Neighbor-Label Capability parameter 120 in LDP Initialization or Capability messages from the peer routers that support neighbor-labels.

LSR B 16 allocates neighbor-labels to be used by LSR B 16 to label switch traffic destined for its neighbor routers (132). In the example of FIG. 1, LSR B 16 allocates a neighbor-label, e.g., L1, for egress router 18 and allocates a neighbor-label, e.g., L2, for LSR A 14. LSR B 16 then installs neighbor-label forwarding state for the allocated neighbor-labels in its forwarding information (134). For example, LSR B 16 installs neighbor-label state 114 in FIB 112 of forwarding engine 110 from FIG. 4 to label switch traffic received with neighbor-label L1 onto the direct link to egress router 18 regardless of the link metrics. Similarly, LSR B 16 installs neighbor-label state 114 to label switch traffic received with neighbor-label L2 onto the direct link to LSR A 14.

LSR B 16 distributes LDP Neighbor-Label Mapping Messages 122 indicating the neighbor-label mappings to capable LDP peer routers over direct sessions and targeted sessions (136). For example, LSR B 16 distributes Neighbor-Label Mapping Messages 122 indicating the neighbor-label mapping between label L1 and egress router 18 and the neighbor-label mapping between label L2 and LSR A 14 to peer LSR A 14 over the direct session and to peer ingress router 12 over targeted session 26.

LSR B 16 may then receive traffic encapsulated with a neighbor-label for one of the neighbor routers (138). LSR B 16 then forwards the received traffic to the neighbor router in accordance with the neighbor-label state for the neighbor-label installed in the forwarding information (140). As an example, LSR B 16 may receive traffic encapsulated with neighbor-label L1 from ingress router 12 via LSR A 14 along LSP 27. The received traffic may be encapsulated with a top label as a label for the FEC of LSP 27 destined for LSR B 16 and a bottom label as the neighbor-label L1 for egress router 18 as advertised by LSR B 16. LSR B 16 then pops the top label and uses the neighbor-label state for L1 to switch the traffic onto the direct link to egress router 18 along alternate LSP 28 regardless of the link metrics.

Figure 9:
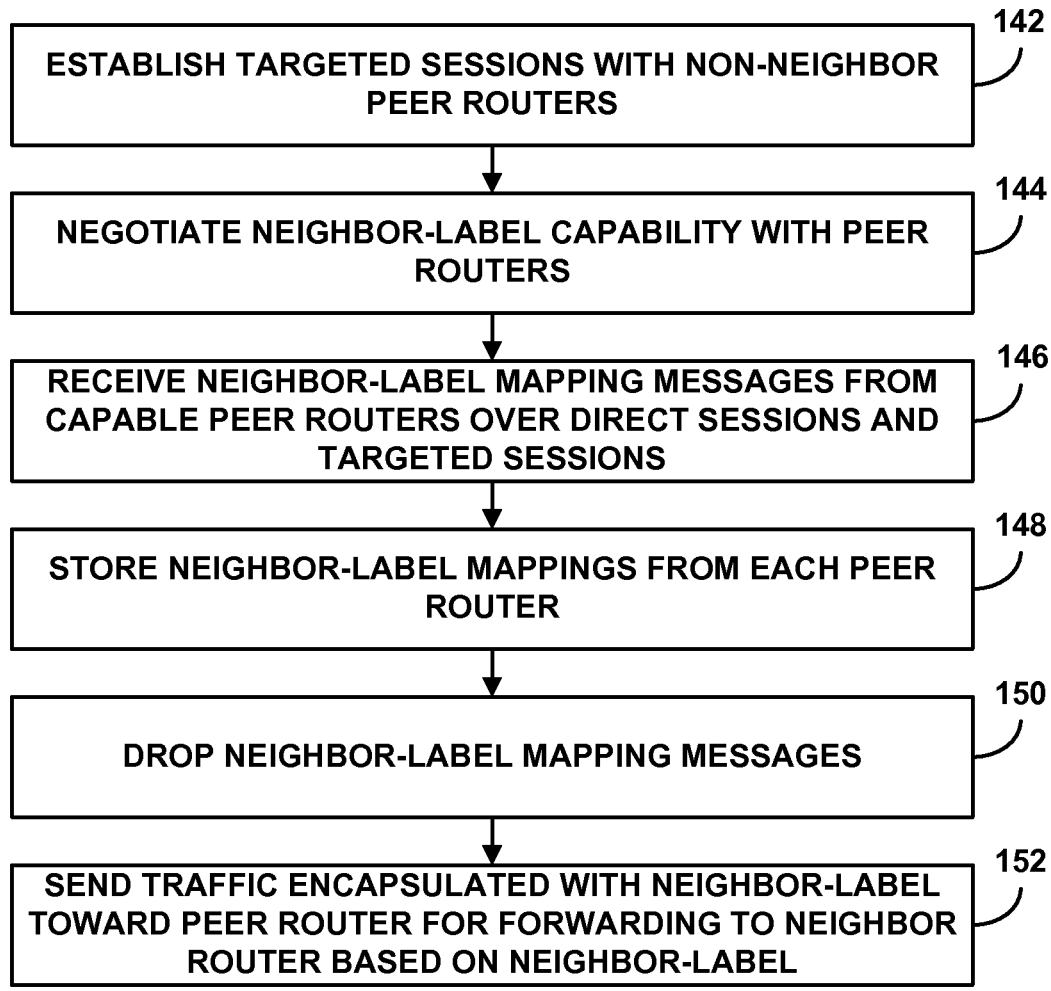
FIG. 9 is a flowchart illustrating an exemplary operation of receiving LDP Neighbor-Label Mapping Messages from LDP peer routers and sending traffic to the LDP peer routers including the neighbor-labels for forwarding to neighbor routers.

FIG. 9 is a flowchart illustrating an example operation of receiving LDP Neighbor-Label Mapping Messages from LDP peer routers and sending traffic to the LDP peer routers encapsulated with the neighbor-labels for forwarding to neighbor routers. The example operation is described herein with respect to ingress router 12 receiving a neighbor-label for egress router 18 from LSR B 16 from FIG. 1. In other examples, the operation of FIG. 9 may be performed by any neighbor-label capable upstream LDP peer router without a loop-free alternate next hop toward a destination router. As one example, the operation of FIG. 9 may be performed by ingress router 32 receiving a neighbor-label for each of inter-AS ASBRs 42 from ASBR 38 from FIG. 2. As another example, the operation of FIG. 9 may be performed by ingress router 52 receiving a neighbor-label for LSR C 58 from LSR A 54 from FIG. 3.

As illustrated in FIG. 1, ingress router 12 has a direct link to egress router 18. Based on the link metrics, primary LSP 24 along the direct link is the only available path from ingress router 12 to egress router 18 in network 10. In this case, ingress router 12 does not have backup coverage to reach egress router 18 via a loop-free alternate path.

According to the techniques of this disclosure, ingress router 12 runs an enhanced Remote LFA algorithm to reach egress router 18 via LSPs 27 and 28 irrespective of the hop-by-hop IGP path determined based on link metrics. LSR B 16 is directly connected to destination egress router 18. Ingress router 12 establishes targeted LDP sessions with non-neighbor peer routers (142). In the example of FIG. 1, ingress router 12 establishes targeted session 26 to LSR B 16 in order to learn neighbor-label mappings for egress router 18. In this case, ingress router 12 has LDP peer routers of LSR A 14 and egress router 18 over direct sessions, and LSR B 16 over targeted session 26.

Ingress router 12 negotiates neighbor-label capability with its peer routers (144). Ingress router 12 advertises its support of neighbor-labels using Neighbor-Label Capability parameter 120 included in LDP Initialization or Capability messages sent to its peer routers during establishment of the LDP sessions. Ingress router 12 also receives Neighbor-Label Capability parameter 120 in LDP Initialization or Capability messages from the peer routers that support neighbor-labels.

Ingress router 12 receives LDP Neighbor-Label Mapping Messages 122 indicating neighbor-label mappings from capable LDP peer routers over direct sessions and targeted sessions (146). For example, ingress router 12 receives Neighbor-Label Mapping Messages 122 indicating the neighbor-label mappings, e.g., L1 to egress router 18 and L2 to LSR A 14, from peer LSR B 16 over targeted session 26. In addition, ingress router 12 receives Neighbor-Label Mapping Messages 122 indicating the neighbor-label mappings, e.g., to LSR B 16 and to itself, ingress router 12, from peer LSR A 14 over the direct session. Ingress router 12 stores the received neighbor-label mappings from each of its peer routers (148). For example, ingress router 12 stores the neighbor-label mappings with neighbor-label unit 96 of extended LDP 92 executed in routing engine 90 from FIG. 4. Ingress router 12 then drops Neighbor-Label Mapping Messages 122 received from its peer routers without forwarding the messages to other peer routers (150).

Ingress router 12 may then send traffic encapsulated with a neighbor-label toward one of the peer routers for forwarding to a neighbor router of the one of the peer routers based on the neighbor-label (152). As an example, when the direct link between ingress router 12 and egress router 18 fails, ingress router 12 sends traffic destined for egress router 18 encapsulated with neighbor-label L1 to LSR B 16 via LSR A 14 along LSP 27. Ingress router 12 may encapsulate the traffic with a top label as a label for the FEC of LSP 27 destined for LSR B 16 and a bottom label as the neighbor-label L1 for egress router 18 as advertised by LSR B 16. LSR B 16 then pops the top label and forwards the traffic onto the direct link to egress router 18 along alternate LSP 28 regardless of the link metrics.

Various examples of the techniques of the disclosure have been described. These and other examples are within the scope of the following claims.

The invention claimed is:

1. A method comprising:
   allocating, with a router, neighbor-labels to be used by the router to label switch traffic destined for respective ones of a plurality of neighbor routers directly connected to the router;
   distributing, with the router to one or more Label Distribution Protocol (LDP) peer routers of the router, LDP neighbor-label mapping messages indicating mappings between the allocated neighbor-labels and the neighbor routers, wherein each of the LDP peer routers has one of a direct LDP session with the router or a targeted LDP session with the router;
   receiving, with the router from one of the LDP peer routers, traffic encapsulated with one of the neighbor-labels; and
   forwarding the traffic to one of the neighbor routers based on the one of the neighbor-labels.

2. The method of claim 1, wherein forwarding the traffic comprises forwarding the traffic to the one of the neighbor routers regardless of metrics associated with a link between the router and the one of the neighbor routers.

3. The method of claim 1, further comprising installing neighbor-label forwarding state associating the allocated neighbor-labels with links to the neighbor routers in forwarding information of the router.

4. The method of claim 3, wherein forwarding the traffic to the one of the neighbor routers based on the one of the neighbor-labels comprises label switching the traffic onto the link to the one of the neighbor routers in accordance with the neighbor-label forwarding state for the one of the neighbor-labels.

5. The method of claim 1, wherein receiving the traffic encapsulated with one of the neighbor-labels comprises receiving the traffic encapsulated with a label stack including a label for a forwarding equivalence class (FEC) destined for the router and the one of the neighbor-labels allocated by the router for the one of the neighbor routers.

6. The method of claim 1, further comprising negotiating to determine whether each of the LDP peer routers supports neighbor-label procedures, wherein distributing the LDP neighbor-label mapping messages comprises distributing the LDP neighbor-label mapping messages only to the LDP peer routers that support the neighbor-label procedures.

7. The method of claim 6, wherein negotiating comprises:
   sending a neighbor-label capability advertisement to each of the LDP peer routers indicating that the router supports the neighbor-label procedures; and
   receiving neighbor-label capability advertisements from at least one of the LDP peer routers indicating support of the neighbor-label procedures,
   wherein each of the neighbor-label capability advertisements comprises one of a LDP initialization message or a LDP capability message that includes a neighbor-label capability parameter type-length-value (TLV).

8. The method of claim 1, wherein each of the LDP neighbor-label mapping messages includes a forwarding equivalence class (FEC) type-length-value (TLV) with a neighbor FEC element type that specifies a FEC destined for one of the neighbor routers, and a label TLV that specifies one of the neighbor-labels mapped to the FEC for the one of the neighbor routers.

9. The method of claim 1, further comprising, when the router no longer operates as a neighbor to one of the neighbor routers, sending a LDP neighbor-label withdraw message to each of the LDP peer routers indicating to not use the previously distributed neighbor-label mapping for the one of the neighbor routers.

10. The method of claim 9, further comprising, in response to sending the LDP neighbor-label withdraw message, receiving a LDP neighbor-label release message from each of the LDP peer routers indicating that the LDP peer routers do not need the previously distributed neighbor-label mapping for the one of the neighbor routers.

11. A router comprising one or more processors configured to execute:
  a routing engine to allocate neighbor-labels to be used by the router to label switch traffic destined for respective ones of a plurality of neighbor routers directly connected to the router, and distribute, to one or more Label Distribution Protocol (LDP) peer routers of the router, LDP neighbor-label mapping messages indicating mappings between the allocated neighbor-labels and the neighbor routers, wherein each of the LDP peer routers has one of a direct LDP session or a targeted LDP session with the router; and
  a forwarding engine to receive traffic encapsulated with one of the neighbor-labels from one of the LDP peer routers, and forward the traffic to one of the neighbor routers based on the one of the neighbor-labels.

12. The router of claim 11, wherein the forwarding engine forwards the traffic to the one of the neighbor routers regardless of metrics associated with a link between the router and the one of the neighbor routers.

13. The router of claim 11, wherein the routing engine installs neighbor-label forwarding state associating the allocated neighbor-labels with links to the neighbor routers in forwarding information of the forwarding engine.

14. The router of claim 13, wherein the forwarding engine label switches the traffic onto the link to the one of the neighbor routers in accordance with the neighbor-label forwarding state for the one of the neighbor-labels in order to forward the traffic to the one of the neighbor routers.

15. The router of claim 11, wherein the forwarding engine receives the traffic encapsulated with a label stack including a label for a forwarding equivalence class (FEC) destined for the router and the one of the neighbor-labels allocated by the router for the one of the neighbor routers.

16. The router of claim 11, wherein the routing engine negotiates to determine whether each of the LDP peer routers supports neighbor-label procedures, and only distributes the LDP neighbor-label mapping messages to the LDP peer routers that support the neighbor-label procedures.

17. The router of claim 16, wherein, to negotiate, the routing engine:
  sends a neighbor-label capability advertisement to each of the LDP peer routers indicating that the router supports the neighbor-label procedures; and
  receives neighbor-label capability advertisements from at least one of the LDP peer routers indicating support of the neighbor-label procedures,
  wherein each of the neighbor-label capability advertisements comprises one of a LDP initialization message or a LDP capability message that includes a neighbor-label capability parameter type-length-value (TLV).

18. The router of claim 11, wherein each of the LDP neighbor-label mapping messages includes a forwarding equivalence class (FEC) type-length-value (TLV) with a neighbor FEC element type that specifies a FEC destined for one of the neighbor routers, and a label TLV that specifies one of the neighbor-labels mapped to the FEC for the one of the neighbor routers.

19. The router of claim 11, wherein, when the router no longer operates as a neighbor to one of the neighbor routers, the routing engine sends a LDP neighbor-label withdraw message to each of the LDP peer routers indicating to not use the previously distributed neighbor-label mapping for the one of the neighbor routers.

20. The router of claim 19, wherein, in response to sending the LDP neighbor-label withdraw message, the routing engine receives a LDP neighbor-label release message from each of the LDP peer routers indicating that the LDP peer routers do not need the previously distributed neighbor-label mapping for the one of the neighbor routers.

21. A method comprising:
  receiving, with a router from one or more Label Distribution Protocol (LDP) peer routers of the router, LDP neighbor-label mapping messages indicating mappings between neighbor-labels and neighbor routers directly connected to the LDP peer routers, wherein the neighbor-labels are used by the LDP peer routers to label switch traffic destined for respective ones of the directly connected neighbor routers, and wherein each of the LDP peer routers has one of a direct LDP session or a targeted LDP session with the router;
  storing, with the router, the neighbor-label mappings from each of the LDP peer routers; and
  sending, with the router, traffic encapsulated with one of the neighbor-labels toward one of the LDP peer routers for forwarding to one of the neighbor routers based on the one of the neighbor-labels.

22. The method of claim 21, wherein sending the traffic comprises sending the traffic toward the one of the LDP peer routers for forwarding to the one of the neighbor routers regardless of metrics associated with a link between the one of the LDP peer routers and the one of the neighbor routers.

23. The method of claim 21, further comprising establishing targeted LDP sessions with one or more of the peer routers that are not directly connected neighbors of the router in order to receive the LDP neighbor-label mapping messages from the non-neighbor peer routers.

24. The method of claim 21, further comprising, upon receiving the LDP neighbor-label mapping messages from the LDP peer routers and storing the neighbor-label mappings, dropping the LDP neighbor-label mapping messages.

25. The method of claim 21, wherein sending the traffic encapsulated with one of the neighbor-labels comprises sending the traffic encapsulated with a label stack including a label for a forwarding equivalence class (FEC) destined for the one of the LDP peer routers and the one of the neighbor-labels for the one of the neighbor routers.

26. The method of claim 21, further comprising negotiating to determine whether each of the LDP peer routers supports neighbor-label procedures, wherein receiving the LDP neighbor-label mapping messages comprises receiving the LDP neighbor-label mapping messages only from the LDP peer routers that support the neighbor-label procedures.

27. The method of claim 26, wherein negotiating comprises:
sending a neighbor-label capability advertisement to each of the LDP peer routers indicating that the router supports the neighbor-label procedures; and
receiving neighbor-label capability advertisements from at least one of the LDP peer routers indicating support of the neighbor-label procedures,
wherein each of the neighbor-label capability advertisements comprises one of a LDP initialization message or a LDP capability message that includes a neighbor-label capability parameter type-length-value (TLV).

28. The method of claim 21, wherein each of the LDP neighbor-label mapping messages includes a forwarding equivalence class (FEC) type-length-value (TLV) with a neighbor FEC element type that specifies a FEC destined for one of the neighbor routers of one of the LDP peer routers, and a label TLV that specifies one of the neighbor-labels mapped to the FEC for the one of the neighbor routers.

29. The method of claim 21, further comprising, when one of the LDP peer routers no longer operates as a neighbor to one of the neighbor routers, receiving a LDP neighbor-label withdraw message from the one of the LDP peer routers indicating to not use the previously distributed neighbor-label mapping for the one of the neighbor routers.

30. The method of claim 29, further comprising, in response to receiving the LDP neighbor-label withdraw message, sending a LDP neighbor-label release message to the one of the LDP peer routers indicating that the router does not need the previously distributed neighbor-label mapping for the one of the neighbor routers of the one of the LDP peer routers.

31. A router comprising one or more processors configured to execute:
a routing engine to receive, from one or more Label Distribution Protocol (LDP) peer routers of the router, LDP neighbor-label mapping messages indicating mappings between neighbor-labels and neighbor routers directly connected to the LDP peer routers, and store the neighbor-label mappings from each of the LDP peer routers, wherein the neighbor-labels are used by the LDP peer routers to label switch traffic destined for respective ones of the directly connected neighbor routers, and wherein each of the LDP peer routers has one of a direct LDP session or a targeted LDP session with the router; and
a forwarding engine to send traffic encapsulated with one of the neighbor-labels from the router toward one of the LDP peer routers for forwarding to one of the neighbor routers of the one of the LDP peer routers based on the one of the neighbor-labels.

32. The router of claim 31, wherein the forwarding engine sends the traffic toward the one of the LDP peer routers for forwarding to the one of the neighbor routers regardless of metrics associated with a link between the one of the LDP peer routers and the one of the neighbor routers.

33. The router of claim 31, wherein the routing engine establishes targeted LDP sessions with one or more of the LDP peer routers that are not directly connected neighbors of the router in order to receive the LDP neighbor-label mapping messages from the non-neighbor peer routers.

34. The router of claim 31, wherein, upon receiving the LDP neighbor-label mapping messages from the LDP peer routers and storing the neighbor-label mappings, the routing engine drops the LDP neighbor-label mapping messages.

35. The router of claim 31, wherein the forwarding engine sends the traffic encapsulated with a label stack including a label for a forwarding equivalence class (FEC) destined for the one of the LDP peer routers and the one of the neighbor-labels for the one of the neighbor routers.

36. The router of claim 31, wherein the routing engine negotiates to determine whether each of the LDP peer routers supports neighbor-label procedures, wherein receiving the LDP neighbor-label mapping messages comprises receiving the LDP neighbor-label mapping messages only from the LDP peer routers that support the neighbor-label procedures.

37. The router of claim 36, wherein, to negotiate, the routing engine:
sends a neighbor-label capability advertisement to each of the LDP peer routers indicating that the router supports the neighbor-label procedures; and
receives neighbor-label capability advertisements from at least one of the LDP peer routers indicating support of the neighbor-label procedures,
wherein each of the neighbor-label capability advertisements comprises one of a LDP initialization message or a LDP capability message that includes a neighbor-label capability parameter type-length-value (TLV).

38. The router of claim 31, wherein each of the LDP neighbor-label mapping messages includes a forwarding equivalence class (FEC) type-length-value (TLV) with a neighbor FEC element type that specifies a FEC destined for one of the neighbor routers of one of the LDP peer routers, and a label TLV that specifies one of the neighbor-labels mapped to the FEC for the one of the neighbor routers.

39. The router of claim 31, wherein, when one of the LDP peer routers no longer operates as a neighbor to one of the neighbor routers, the routing engine receives a LDP neighbor-label withdraw message from the one of the LDP peer routers indicating to not use the previously distributed neighbor-label mapping for the one of the neighbor routers.

40. The router of claim 39, wherein, in response to receiving the LDP neighbor-label withdraw message, the routing engine sends a LDP neighbor-label release message to the one of the LDP peer routers indicating that the router does not need the previously distributed neighbor-label mapping for the one of the neighbor routers of the one of the LDP peer routers.

41. A non-transitory computer-readable storage medium comprising instructions that cause a programmable processor to:
allocate, with a router, neighbor-labels to be used by the router to label switch traffic destined for respective ones of a plurality of neighbor routers directly connected to the router;
distribute, with the router to one or more Label Distribution Protocol (LDP) peer routers of the router, LDP neighbor-label mapping messages indicating mappings between the allocated neighbor-labels and the neighbor routers, wherein each of the LDP peer routers has one of a direct LDP session with the router or a targeted LDP session with the router;
receive, with the router from one of the LDP peer routers, traffic encapsulated with one of the neighbor-labels; and
forward the traffic to one of the neighbor routers based on the one of the neighbor-labels.

* * * * *